United States Patent
Menzies

(10) Patent No.: US 6,575,053 B2
(45) Date of Patent: Jun. 10, 2003

(54) ELECTRONICALLY CONTROLLED PEDAL ASSEMBLY HAVING A HYSTERESIS GENERATING STRUCTURE

(75) Inventor: Bradley C. Menzies, Flint, MI (US)

(73) Assignee: Teleflex Incorporated, Plymouth Meeting, PA (US)

(*) Notice: Subject to any disclaimer, the term of this patent is extended or adjusted under 35 U.S.C. 154(b) by 36 days.

(21) Appl. No.: 09/865,800

(22) Filed: May 25, 2001

(65) Prior Publication Data

US 2002/0174738 A1 Nov. 28, 2002

(51) Int. Cl.$^7$ .................................................. G05G 1/14
(52) U.S. Cl. ............................ 74/513; 74/512; 74/560; 123/399
(58) Field of Search ........................... 74/512–514, 560; 307/10.1; 200/61.89; 180/271; 123/399

(56) References Cited

U.S. PATENT DOCUMENTS

| | | | |
|---|---|---|---|
| 4,582,653 A | 4/1986 | Blanchard et al. | |
| 4,869,220 A | 9/1989 | Imoehl | |
| 4,907,468 A | 3/1990 | Hagiwara et al. | |
| 4,915,075 A | 4/1990 | Brown | |
| 4,944,269 A | 7/1990 | Imoehl | |
| 4,958,607 A | 9/1990 | Lundberg | |
| RE34,302 E | 7/1993 | Imoehl | |
| 5,233,882 A | 8/1993 | Byram et al. | |
| 5,241,936 A | 9/1993 | Byler et al. | |
| RE34,574 E | 4/1994 | Imoehl | |
| 5,369,870 A | 12/1994 | Ouchi et al. | |
| 5,385,068 A | 1/1995 | White et al. | |
| 5,408,899 A | 4/1995 | Stewart | |
| 5,529,296 A | 6/1996 | Kato et al. | |
| 5,697,260 A | 12/1997 | Rixon et al. | |
| 5,768,946 A | * 6/1998 | Fromer et al. | ................. 74/514 |
| 5,819,593 A | 10/1998 | Rixon et al. | |
| 6,158,299 A | 12/2000 | Czajkowski | |
| 6,263,859 B1 | * 7/2001 | Kalsi | ........................... 123/399 |
| 6,330,838 B1 | * 12/2001 | Kalsi | ........................... 74/514 |

FOREIGN PATENT DOCUMENTS

| | | | |
|---|---|---|---|
| DE | 10022739 A1 | * 10/2001 | .................. 74/514 |
| JP | 2000 326754 | * 11/2000 | .................. 74/514 |
| WO | PCT/GB97/00525 | * 8/1997 | .................. 74/514 |

\* cited by examiner

Primary Examiner—Vinh T. Luong
(74) Attorney, Agent, or Firm—Howard & Howard

(57) ABSTRACT

A pedal assembly (10) having a housing (12) and a pedal arm (14) pivotally connected to the housing (12) for movement between a rest position and an operative position. A pair of springs (38, 40) are mounted within the housing (12). The springs (38, 40) have first distal ends (42, 46) seated against the housing (12) and second distal ends (44, 48) engaging a second end (20) of the pedal arm (14) to provide resistance during the movement of the pedal arm (14). A cap (60) is disposed over the second end (20) of the pedal arm (14). The pedal assembly (10) is characterized by the cap (60) including a first portion (62) and a second portion (64) with the second distal ends (44, 48) of the springs (38, 40) engaging the cap (60). The second portion (64) of the cap (60) is movable relative to the first portion (62) of the cap (60) when the pedal arm (14) moves between the rest and operative positions such that the first (62) and second (64) portions engage an inner surface (28) of the housing (12) to provide increased resistance during the movement of the pedal arm (14).

37 Claims, 4 Drawing Sheets

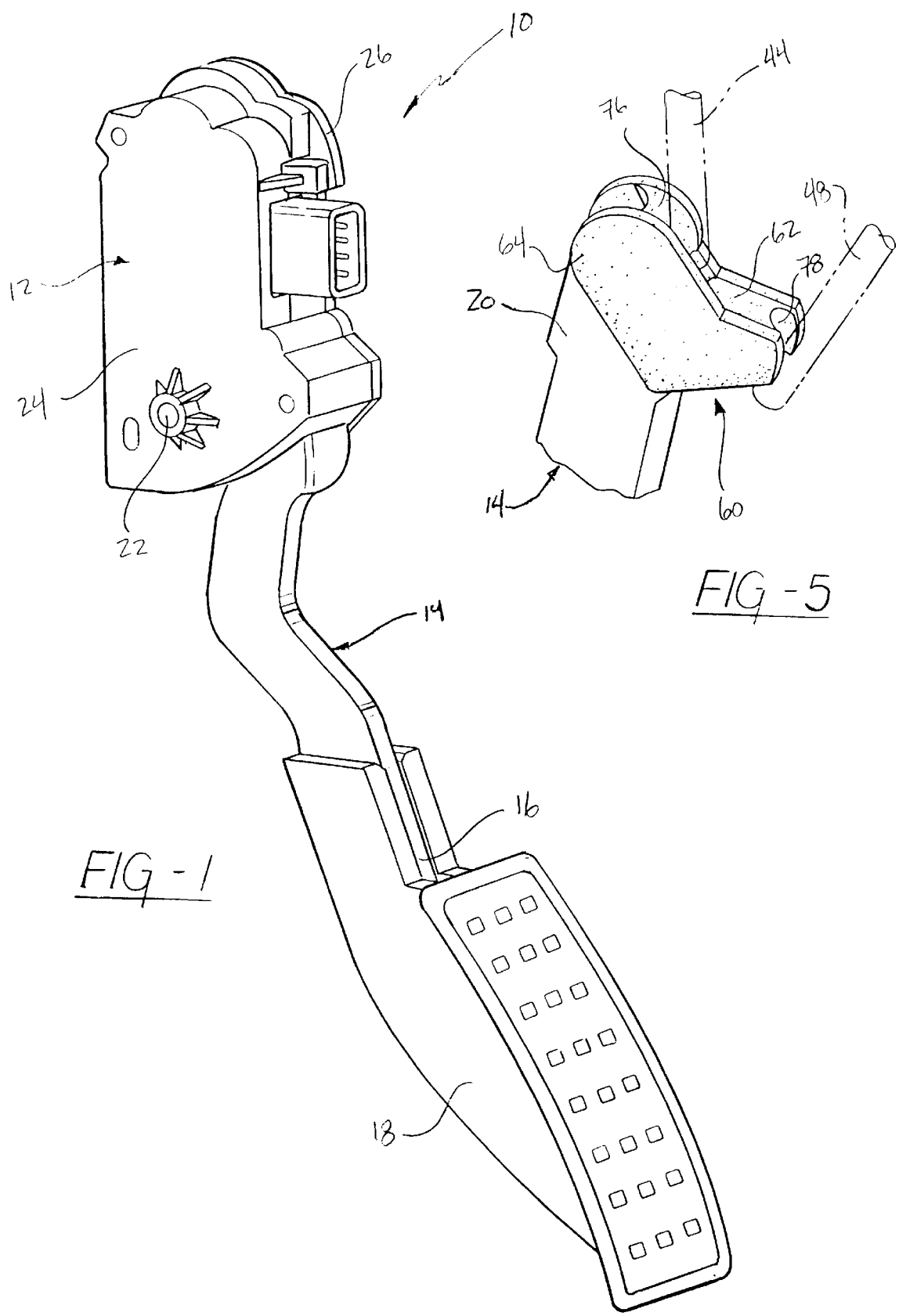

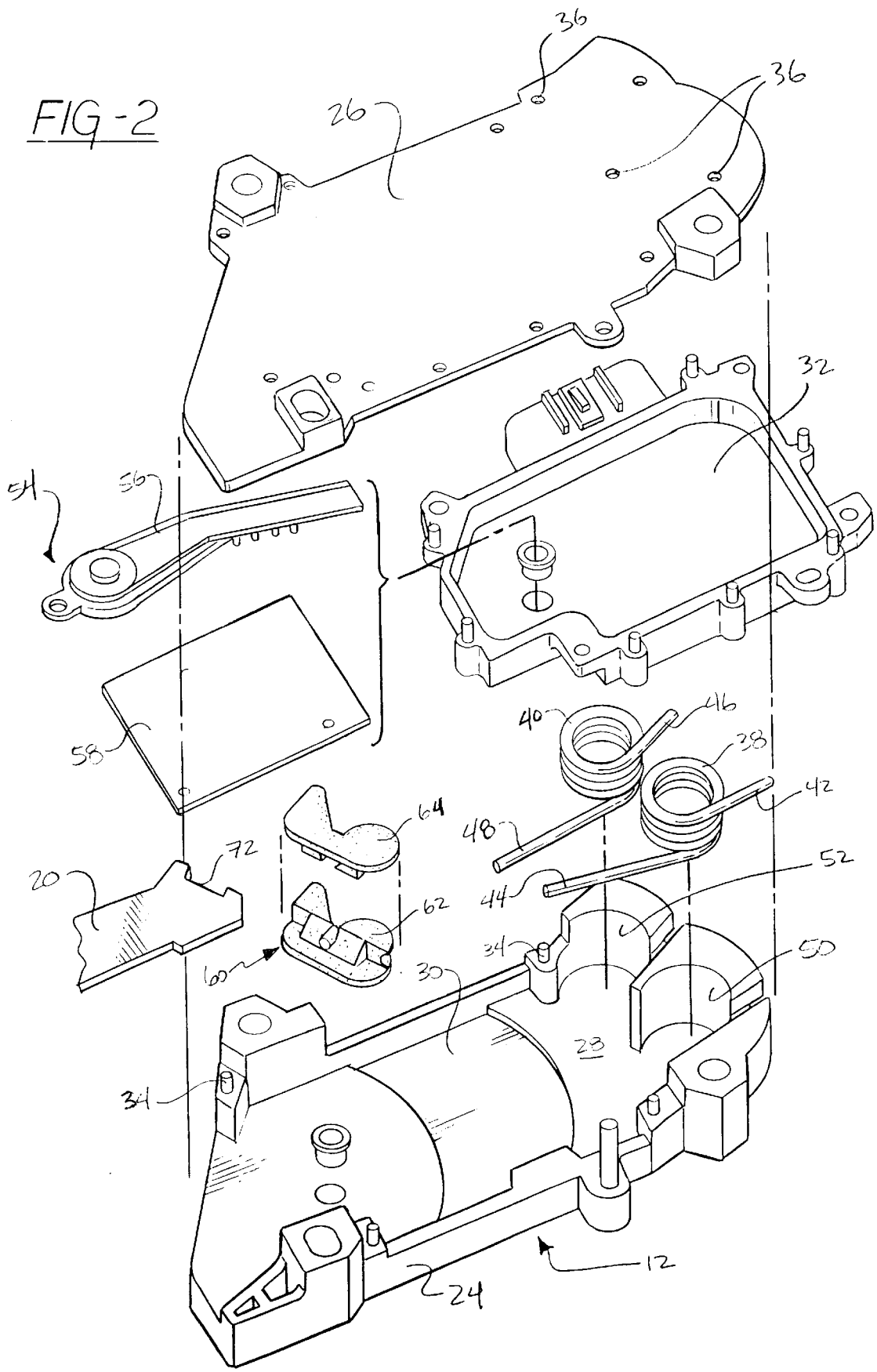

ELECTRONICALLY CONTROLLED PEDAL ASSEMBLY HAVING A HYSTERESIS GENERATING STRUCTURE

BACKGROUND OF THE INVENTION

1. Field of the Invention

The subject invention relates to a vehicle foot pedal assembly having an electronic control with a hysteresis generating structure incorporated therein.

2. Description of the Prior Art

Accelerator and brake foot pedal assemblies are used to mechanically control a vehicle engine and brakes, respectively. The foot pedal assemblies usually include a pedal arm mounted to a vehicle body with a series of links and levers connecting the pedal arm to an associated device, such as a carburetor, fuel injector, controller, brake drum, brake housing, or the like. These linkages must be designed to withstand and accommodate engine movements relative to the vehicle frame, as well as provide accurate control despite such movements. In addition, packaging space must be provided for the linkages to function properly. The space available for routing the mechanical control links, rods, and cables is limited.

An improvement in the automotive industry relating to foot pedal assemblies is the use of drive-by-wire systems. Drive-by-wire systems allow the control of the vehicle engine or brakes without the need for a direct mechanical connection between the pedal arms and the engine or brakes. These systems utilize electrical or electronic means rather that mechanical links.

In the drive-by-wire systems, it is important that the pedal arm provide the customary feel and performance of a mechanical linkage. The foot pedal assemblies should function responsively to driver input and should provide non-fatiguing resistance. Drivers are accustomed to certain applying and releasing pressures on a pedal arm and have become accustomed to the resistance force of the pedal arm as well as the rate of withdrawal as the applied pressure is relaxed.

Typically, the pedal arm pressure required when advancing an accelerator pedal, for example, is greater than that required to maintain a fixed position. This difference is often referred to as a hysteresis effect. This effect is important in maintaining the pedal arm in position while driving at a relatively constant speed or for continuous braking. The pressure which must be applied in accelerating, for example, is easily borne but if the back pressure of an accelerator spring produced the same effect during the time it was required to retain or maintain speed, it would soon become uncomfortable for the driver to maintain a relatively constant speed. The hysteresis effect provides relief and lessons the load required to maintain a setting of the pedal arm. Yet there is still force to cause reverse pedal action when the applied pressure is removed.

The hysteresis effect is also important for eliminating undesirable accelerations, decelerations, and uneven brakeages as the vehicle is driven over rough terrain, such as bumpy roads. When the vehicle is driven over a bumpy road, the driver's foot follows the terrain causing the vehicle to accelerate, decelerate, or brake unevenly, which is undesirable. Thus, hysteresis is needed to provide stability to the vehicle over rough terrain.

Drive-by-wire systems for vehicle engines with hysteresis generating mechanisms are known. One such device is shown in U.S. Pat. No. 5,408,899. Often these hysteresis generating mechanisms are complex, include a significant number of parts, and are difficult to assemble.

An improved drive-by-wire system with a hysteresis generating mechanism is disclosed in U.S. Pat. No. 6,158,299 and is assigned to the assignee of the subject invention. The invention of the '299 patent provides a pedal assembly having an electronic control with a hysteresis generating mechanism which is simplified, requires fewer components, and is easier to maintain and assemble than the prior systems.

The subject invention is a further improvement of the design disclosed in the '299 patent such that even a greater hysteresis effect can be realized.

SUMMARY OF THE INVENTION AND ADVANTAGES

A pedal assembly comprising a housing having at least one inner surface. A pedal arm is pivotally connected to the housing for movement between a rest position and an operative position. The pedal arm has a first end and a second end. A resilient member is partially received within the housing. The resilient member has a first distal end and a second distal end with the first distal end seated against the housing and the second distal end engaging the second end of the pedal arm to provide resistance during the movement of the pedal arm. A cap is at least partially disposed over the second end of the pedal arm. The pedal assembly is characterized by the cap including a first portion and a second portion with the second distal end of the resilient member engaging at least one of the first and second portions of the cap. The second portion is movable relative to the first portion when the pedal arm moves between the rest and operative positions such that at least one of the first and second portions engages the inner surface of the housing to provide increased resistance during the movement of the pedal arm.

The present invention, therefore, creates a greater hysteresis effect such that the customary feel during the application of force on the pedal arm as well as the familiar return movement of the pedal arm is realized with a drive-by-wire system.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a pedal assembly in accordance with the subject invention;

FIG. 2 is an exploded, partially fragmented, view of the pedal assembly;

FIG. 5 is an enlarged perspective view of a cap mounted to the pedal arm of the pedal assembly;

DETAILED DESCRIPTION OF THE PREFERRED EMBODIMENT

Figure 4:
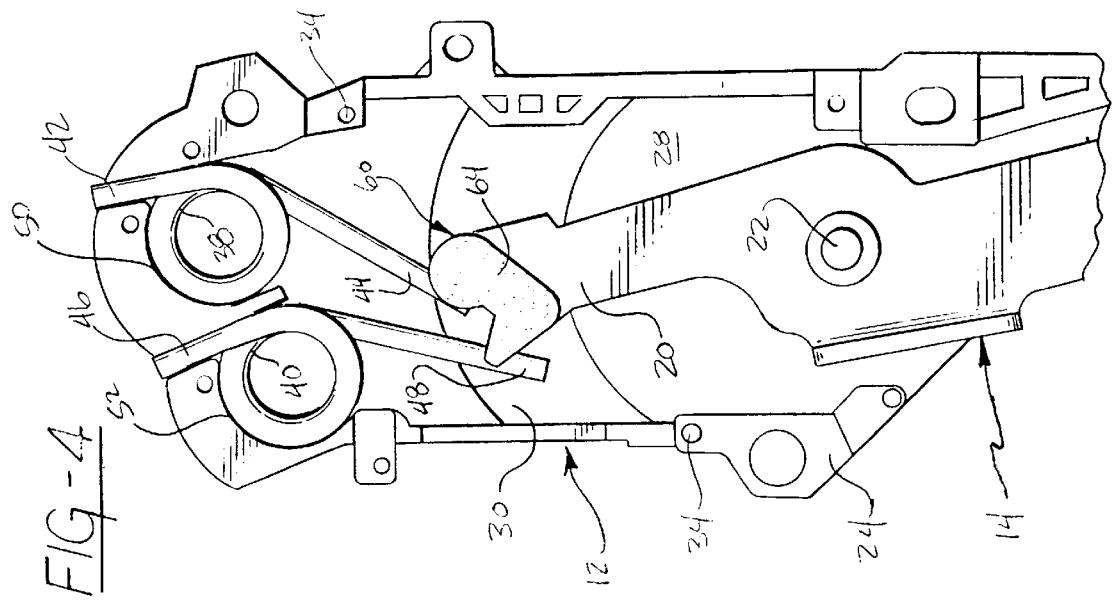
FIG. 4 is a plan view of the pedal arm in an operative position.

Referring to the Figures, wherein like numerals indicate like or corresponding parts throughout the several views, a pedal assembly is generally shown at 10 in FIG. 1. For illustrative purposes, an electronic throttle control (ETC) accelerator pedal assembly 10 is shown. It should be appreciated that the subject invention as herein described may be utilized on any suitable pedal assembly and any reference to an accelerator pedal is merely for descriptive purposes and is in no way limiting.

The pedal assembly 10 comprises a housing 12 and a pedal arm 14 pivotally connected to the housing 12 for movement between a rest position and an operative position. The housing 12 is preferably formed of a light weight nylon or plastic material while the pedal arm 14 is preferably formed from a steel or plastic material.

The rest position of the pedal arm 14 is a position when no pressure is being applied by a user or driver. The operative position of the pedal arm 14 may be any such position of the pedal arm 14 except the rest position. In other words, the operative position of the pedal arm 14 is when the driver is applying a force, either variable or constant, to the pedal arm 14, or when the driver has released the force on the pedal arm 14 and the pedal arm 14 has yet to return to the rest position. The pedal arm 14 has a first end 16 with a pedal pad 18 of any suitable design preferably mounted thereon. The pedal arm 14 also has an opposite second end 20 which is best illustrated in FIG. 2. The second end 20 of the pedal arm 14 includes a distal portion which is preferably enclosed within the housing 12.

Figure 3:
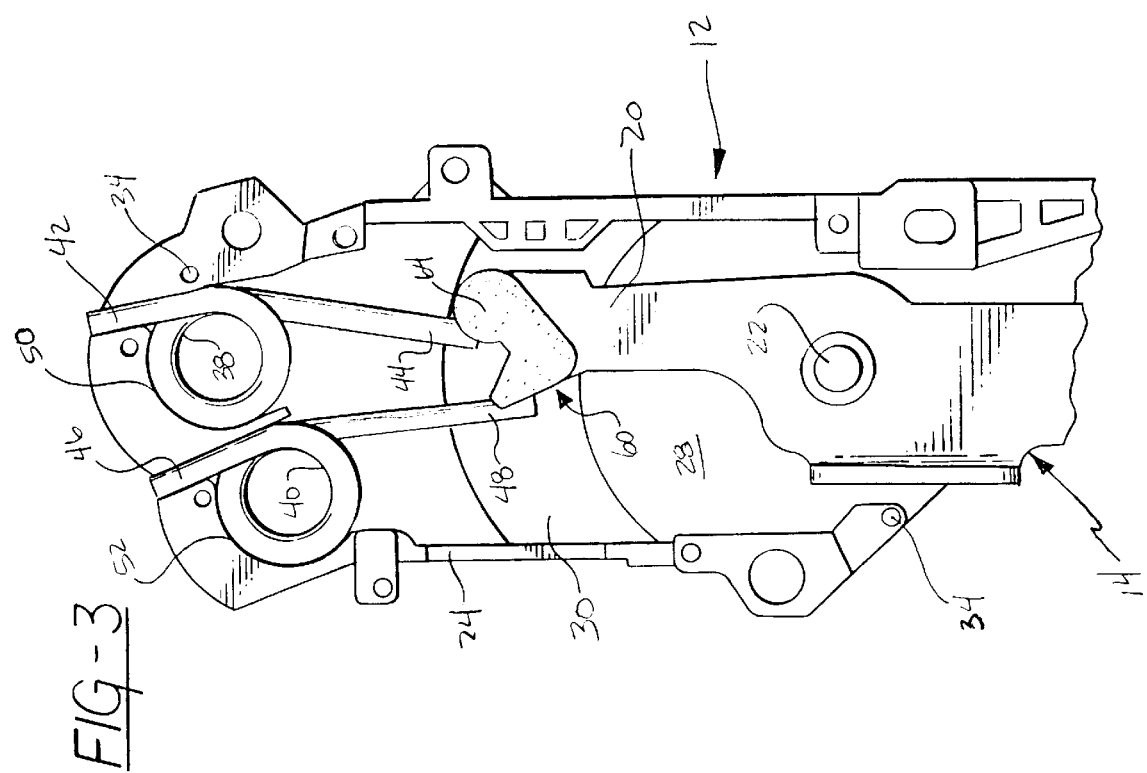
FIG. 3 is a plan view of a pedal arm of the pedal assembly in a rest position.

A shaft 22 is mounted to the housing 12, which is best shown in FIGS. 1, 3, and 4, with the pedal arm 14 mounted to the shaft 22 to define a pivot axis of the pedal arm 14. The second end 20 of the pedal arm 14 extends above the shaft 22 within the housing 12 and the first end 16 of the pedal arm 14 extends below the shaft 22 outside of the housing 12.

Referring to FIG. 2, the housing 12 is shown in an exploded relationship illustrating a main body portion 24 and a cover 26 with at least one inner surface 28. Preferably the inner surface 28 of the housing 12 includes an integral channel 30 disposed in the main body portion 24. The inner surface 28 of the housing 12 may also be defined by the cover 26 or a partition 32. The partition 32 is mounted within the housing 12 between the main body portion 24 and the cover 26. The cover 26 is designed to provide a sealed environment for the housing 12 to keep dirt and debris from interfering with the inner workings of the housing 12. An epoxy sealer can be applied between the cover 26 and the housing 12 for sealing purposes. Other sealing methods known in the art can also be used.

The housing 12 also includes a plurality of tabs 34 spaced around a circumferential lip of the housing 12. The tabs 34 are inserted into corresponding openings 36 in the cover 26 and are heat staked to fasten the cover 26 to the housing 12. It should be understood, however, that other fastening methods known in the art could also be used to connect the cover 26 to the housing 12.

At least one resilient member 38, 40 is partially received within the housing 12. Preferably there is a first resilient member 38 and a second resilient member 40 each partially received within the housing 12 between the partition 32 and the main body portion 24. Even more preferably, the resilient members 38, 40 are coiled springs 38, 40 having first 42, 46 and second 44, 48 distal ends. Although not required, having the two springs 38, 40 provides a redundancy for safety purposes in that if one spring 38, 40 fails, the pedal assembly 10 will still be operative through the other spring 38, 40. It should be understood that more or less than two coil springs could be utilized in the subject invention.

The first distal end 42 of the first resilient member 38 is seated against the housing 12 and the second distal end 44 of the first resilient member 38 engages the second end 20 of the pedal arm 14 to provide resistance during the movement of the pedal arm 14. Similarly, the first distal end 46 of the second resilient member 40 is seated against the housing 12 and the second distal end 48 of the second resilient member 40 engages the second end 20 of the pedal arm 14 to provide additional resistance during the movement of the pedal arm 14.

Preferably, the housing 12 includes a first curved recess 50 and the first resilient member 38 includes an outer surface. The first resilient member 38 is partially received within the first curved recess 50 such that the outer surface is forced into frictional contact with a portion of the first curved recess 50 during the movement of the pedal arm 14 between the rest and operative positions thereby reducing a biasing force of the first resilient member 38 on the pedal arm 14. Similarly, the housing 12 includes a second curved recess 52 and the second resilient member 40 includes an outer surface. The second resilient member 40 is likewise partially received within the second curved recess 52 such that the outer surface is forced into frictional contact with a portion of the second curved recess 52 during the movement of the pedal arm 14 between the rest and operative positions thereby reducing a biasing force of the second resilient member 40 on the pedal arm 14. The first 38 and second 40 resilient members present a part of a hysteresis generation structure of the subject invention. The specifics of the first 50 and second 52 curved recesses and the first 38 and second 40 resilient members are disclosed and claimed in U.S. Pat. No. 6,158,299 which is assigned to the assignee of the subject invention and is herein incorporated by reference.

The partition 32 is designed to separate the resilient members 38, 40, i.e., the springs 38, 40, from an electronic control sensor 54. As discussed in the background section, the use of the electronic control sensor 54 eliminates the need for mechanical linkages and cable between the pedal arm 14 and the associated device. The control sensor 54 is supported by the housing 12 for generating an electric control signal that varies in magnitude in proportion to the extent of movement of the pedal arm 14 relative to the housing 12. The control sensor 54 includes a sensor arm 56 mounted to the shaft 22 for concurrent pivotal movement with the pedal arm 14 about the common pivot axis. A sensing plate 58 is also mounted within the housing 12 for interacting with the sensor arm 56 as is known in the electronic control art. Preferably, the sensing plate 58 and sensor arm 56 are mounted to the partition 32 on an opposite side of the springs 38, 40. As discussed above, the pedal arm 14 can be further defined as an accelerator pedal arm 14 such that the control sensor 54 generates an electronic throttle control (ETC) signal for controlling an engine throttle (not shown). It should be appreciated that the subject invention can be used to control any suitable device which is to be electronically connected to the pedal arm 14.

Figure 6:
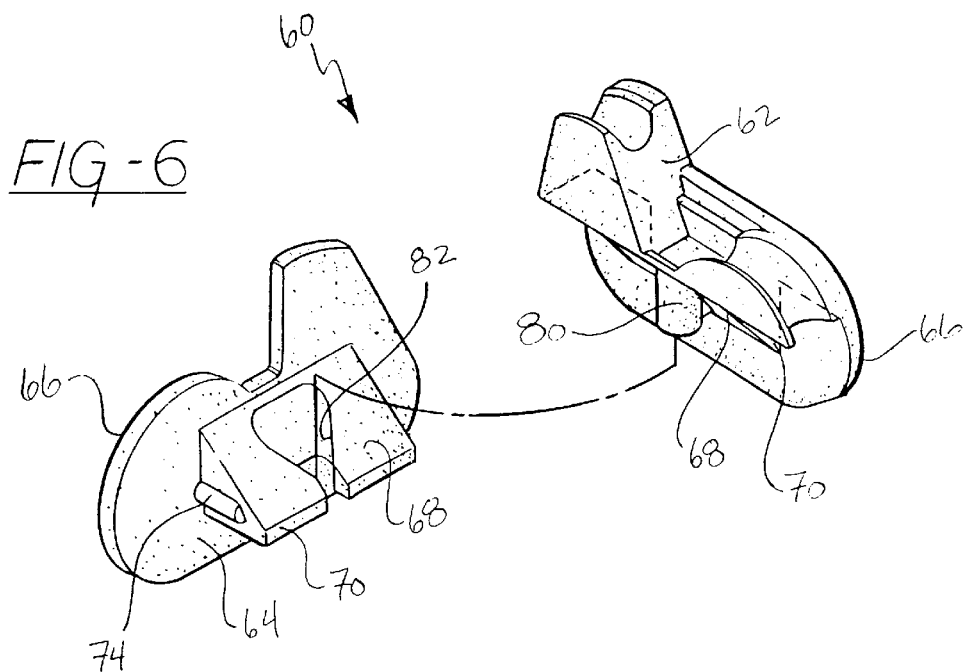
FIG. 6 is an enlarged perspective view of the cap illustrating first and second separable portions.

Referring now to FIGS. 2, 5, and 6, a cap 60 is at least partially disposed over the second end 20 of the pedal arm 14. The cap 60 is preferably made of a plastic material. The pedal assembly 10 is characterized by the cap 60 including a first portion 62 and a second portion 64 with the second distal end 44 of at least one of the resilient members 38, 40 engaging at least one of the first 62 and second 64 portions of the cap 60. As will be discussed in greater detail below, each of the second distal ends 44, 48 of the first 38 and second 40 resilient members preferably engages the cap 60. The springs 38, 40 engaging the cap 60 presents another part of the hysteresis generation structure of the subject invention.

The second portion 64 of the cap 60 is movable relative to the first portion 62 when the pedal arm 14 moves between the rest and operative positions such that at least one of the first 62 and second 64 portions engages the inner surface 28 of the housing 12 to provide increased resistance during the movement of the pedal arm 14. Each of the first 62 and second 64 portions of the cap 60 include a bearing wall 66 with at least one of the bearing walls 66 engaging the inner surface 28 of the housing 12 during the movement of the pedal arm 14. Preferably, one of the bearing walls 66 slides within said channel during the movement of the pedal arm 14. Even more preferably, one of the bearing walls 66 engages the partition 32 and the other of the bearing walls 66 engages the inner surface 28 of the housing 12 within the channel to provide the increased resistance. The bearing walls 66 can be of any suitable size or configuration in relation to the cap 60, pedal arm 14, and housing 12 without deviating from the overall scope of the subject invention.

A movement device is disposed between the bearing walls 66 of the first 62 and second 64 portions for selectively moving the bearing walls 66 inwardly and outwardly relative to each other as the pedal arm 14 moves between the rest and operative positions. The movement device may be of any suitable design or configuration so long as the bearing walls 66 can selectively be pressed against the inner surface 28 of the housing 12. A representative embodiment of the movement device is discussed hereinbelow.

Preferably, the movement device is defined as a ramped section 68 extending from each of the bearing walls 66 of the portions such that the second portion 64 can slide relative to the first portion 62 to move the bearing walls 66 inwardly and outwardly relative to each other. More preferably, the movement device is defined as a wedge 70 extending from each of the bearing walls 66 of the portions. The wedges 70 have interengaging ramped sections 68 such that the wedge 70 of the second portion 64 can slide relative to the wedge 70 of the first portion 62 to move the bearing walls 66 inwardly and outwardly relative to each other. The ramped sections 68 of the wedges 70 preferably extend outwardly at 45° from the bearing walls 66.

The second end 20 of the pedal arm 14 includes a notch 72 (best shown in FIG. 2). The wedge 70 of the second portion 64 seats within the notch 72 when the first 62 and second 64 portions are mounted to the pedal arm 14. Hence, the second portion 64 of the cap 60 engages the pedal arm 14. The wedge 70 of the second portion 64 includes a rib 74 at each end thereof for providing a press fit between the wedge 70 and the notch 72.

The bearing walls 66 of the first 62 and second 64 portions extend outwardly and substantially encompass the distal portion of the second end 20 of the pedal arm 14 as best shown in FIG. 5. The bearing walls 66 ride within the channel 30 to assist in retaining the cap 60 onto the second end 20 of the pedal arm 14. The first 62 and second 64 portions of the cap 60 are therefore loosely retained within the notch 72 of the pedal arm 14. As appreciated, a retainer (not shown) may be provided to further retain the cap 60 onto the pedal arm 14. One contemplated example of a retainer is a U-shaped clip which conforms to the contours of the notch 72 and surrounds the wedges 70 of the first 62 and second 64 portions thereby retaining the portions 62, 64 within the notch 72.

As best shown in FIGS. 5 and 6, the first portion 62 includes at least one cam lobe 76, 78 having an integral groove with the second distal end 44 of at least one of the resilient members 38, 40 being retained within the groove of the cam lobe 76, 78. The first portion 62 of the cap 60 therefore engages the springs 38, 40. In the preferred embodiment, the first portion 62 includes a first cam lobe 76 having a first integral groove with the second distal end 44 of the first resilient member 38 retained within the first integral groove of the first cam lobe 76. The first portion 62 also includes a second cam lobe 78 having a second integral groove with the second distal end 44 of the second resilient member 40 retained within the second integral groove of the second cam lobe 78. The second cam lobe 78 is positioned in an upward stepped relation to the first cam lobe 76 in accordance with the positioning of the springs 38, 40.

As best shown in FIG. 6, the first portion 62 includes a first connector 80 and the second portion 64 includes a second connector 82 engaging the first connector 80. The first 80 and second 82 connectors are slideably interconnected to secure the first portion 62 to the second portion 64. The first connector 80 is further defined as a male projection 80 and the second connector 82 is further defined as a female slot 82 for accepting the male projection 80 when the first 62 and second 64 portions are mounted onto the second end 20 of the pedal arm 14. It should be appreciated that the first 80 and second 82 connectors may be of any suitable design.

Figures 7, 8:
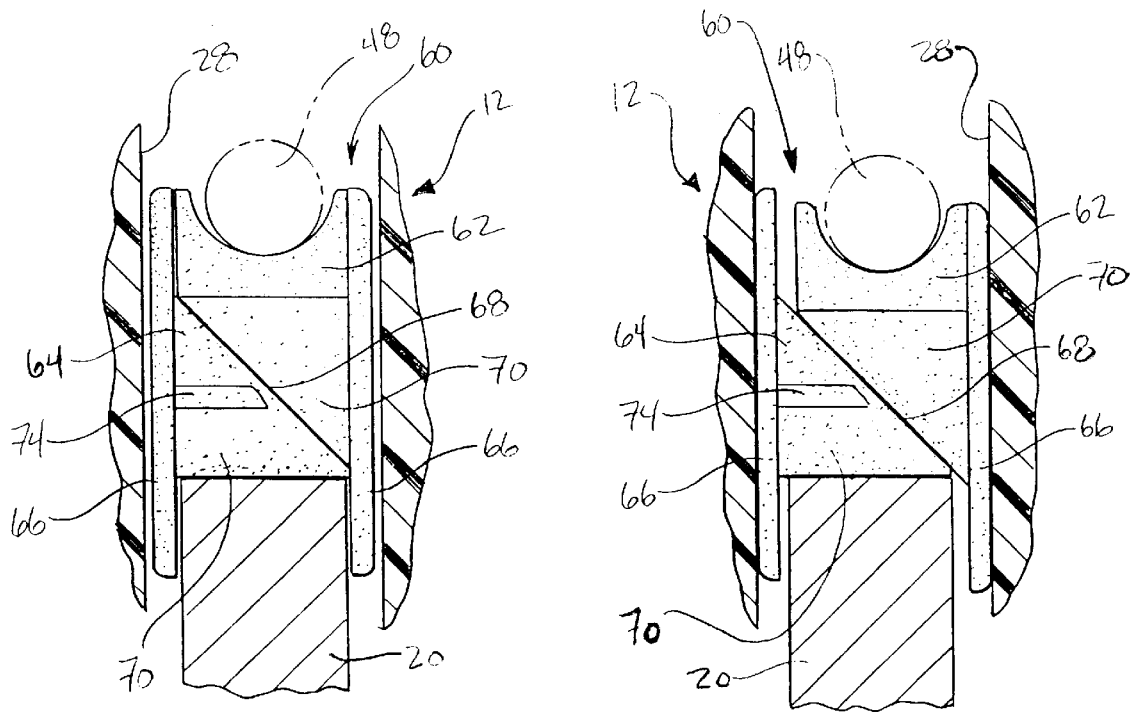
FIG. 7 is a partially cross-sectional side view of the cap mounted to the pedal arm with the pedal arm in a rest position.
FIG. 8 is a partially cross-sectional side view of the cap mounted to the pedal arm with the pedal arm in an operative position.

Referring to FIGS. 3, 4, 7, and 8, the operation of the pedal assembly 10 is discussed in greater detail. As shown in FIGS. 3 and 7, the pedal assembly 10 is in the rest position. Referring to FIG. 7, the bearing walls 66 are illustrated in spaced relationship to the inner surface 28 of the housing 12. It should be appreciated that the bearing walls 66 may be any suitable distance from the inner surface 28 of the housing 12 or may actually abut the inner surface 28 of the housing 12 while in this rest position.

FIGS. 4 and 8 illustrate the pedal assembly 10 in one of the operative positions wherein the driver has applied a force to the pedal arm 14. During the application of force by the driver, the second end 20 of the pedal arm 14 rotates against the biasing force of the resilient members 38, 40 toward the second distal ends 44, 48 of the springs 38, 40. The first distal ends 42, 46 of the springs 38, 40 are retained in the housing 12, thus causing the springs 38, 40 to coil more tightly. This increases the spring force or load applied against the cap 60. In particular, the second distal ends 44, 48 of the springs 38, 40 apply an increased force or load to the second portion 64 of the cap 60 as is shown in FIG. 8. The second portion 64 of the cap 60 transmits the spring load from the springs 38, 40 to the first portion 62 of the cap 60. In particular, this spring force or load is transmitted through the ramped sections 68 of the wedges 70. The spring force is resisted by the notch 72 of the pedal arm 14. Hence, the first 62 and second 64 portions slide relative to each other on the ramped sections 68. The portions slide until the bearing walls 66 abut the inner surface 28 of the housing 12. As discussed above, the bearing walls 66 preferably abut the channel 30 in the main body portion 24 and the partition 32. This abutment transmits the force or load of the springs 38, 40 into the engagement of the bearing walls 66 and the inner surface 28 of the housing 12 for friction creation. This frictional effect decreases the force required to maintain the pedal arm 14 in the current position, thus achieving the desirable hysteresis effect. The hysteresis effect is also created by the coil springs 38, 40 reacting against the curved recesses 50, 52 in the housing 12.

When the force of the driver is removed from the pedal arm 14, the pedal arm 14 returns to the rest position. The spring force against the cap 60 is subsequently reduced. The frictional abutment between the bearing walls 66 and the inner surface 28 of the housing 12 is then minimized. The first 62 and second 64 portions of the cap 60 may return to the non-engaged state as shown in FIG. 7 or may remain in a somewhat engaged or abutted state (FIG. 8). Each application of the pedal arm 14 creates the transmission of the spring forces or loads as discussed above such that a hysteresis effect is maintained.

Obviously, many modifications and variations of the present invention are possible in light of the above teachings. The invention may be practiced otherwise than as specifically described within the scope of the appended claims, wherein the reference numerals in the claims are merely for convenience and are not to be read in any way as limiting.

What is claimed is:

1. A pedal assembly (10) comprising:

a housing (12) having at least one inner surface (28);

a pedal arm (14) pivotally connected to said housing (12) for movement between a rest position and an operative position, said pedal arm (14) having a first end (16) and a second end (20);

a cap (60) at least partially disposed over said second end (20) of said pedal arm (14);

a resilient member (38) partially received within said housing (12) and having a first distal end (42) seated against said housing (12) and a second distal end (44) engaging said cap (60) to provide resistance during said movement of said pedal arm (14); and said assembly characterized by said cap (60) including a first portion (62) and a second portion (64) with said first (62) and second (64) portions moving relative to each other during said movement of said pedal arm (14) and with said second distal end (44) of said resilient member (38) engaging said first portion (62) of said cap (60) for moving at least one of said first (62) and second (64) portions into engagement with said inner surface (28) of said housing (12) in response to said pedal arm (14) moving between said rest and operative positions such that said engagement provides increased resistance during said movement of said pedal arm (14).

2. An assembly as set forth in claim 1 wherein each of said first (62) and second (64) portions of said cap (60) include a bearing wall (66) with at least one of said bearing walls (66) engaging said inner surface (28) of said housing (12) during said movement of said pedal arm (14).

3. An assembly as set forth in claim 2 wherein said inner surface (28) of said housing (12) includes an integral channel (30) with said at least one of said bearing walls (66) sliding within said channel (30) during said movement of said pedal arm (14).

4. An assembly as set forth in claim 2 further including a movement device disposed between said bearing walls (66) of said first (62) and second (64) portions for selectively moving said bearing walls (66) inwardly and outwardly relative to each other as said pedal arm (14) moves between said rest and operative positions.

5. An assembly as set forth in claim 4 wherein said movement device is further defined as a ramped section (68) extending from each of said bearing walls (66) of said portions such that said second portion (64) can slide relative to said first portion (62) to move said bearing walls (66) inwardly and outwardly relative to each other.

6. An assembly as set forth in claim 4 wherein said movement device is further defined as a wedge (70) extending from each of said bearing walls (66) of said portions, said wedges (70) having interengaging ramped sections (68) such that said wedge (70) of said second portion (64) can slide relative to said wedge (70) of said first portion (62) to move said bearing walls (66) inwardly and outwardly relative to each other.

7. An assembly as set forth in claim 6 wherein said ramped sections (68) of said wedges (70) extends outwardly at 45° from said bearing walls (66).

8. An assembly as set forth in claim 6 wherein said second end (20) of said pedal arm (14) includes a notch (72) and said wedge (70) of said second portion (64) seats within said notch (72) when said first (62) and second (64) portions are mounted to said pedal arm (14).

9. An assembly as set forth in claim 8 wherein said wedge (70) of said second portion (64) includes a rib (74) at each end thereof for providing a press fit between said wedge (70) and said notch (72).

10. An assembly as set forth in claim 4 wherein said first portion (62) includes at least one cam lobe (76) having an integral groove with said second distal end (44) of said resilient member (38) being retained within said groove of said cam lobe (76).

11. An assembly as set forth in claim 4 wherein said first portion (62) includes a first connector (80) and said second portion (64) includes a second connector (82) engaging said first connector (80), said first (80) and second (82) connectors are slideably interconnected to secure said first portion (62) to said second portion (64).

12. An assembly as set forth in claim 11 wherein said first connector (80) is further defined as a male projection (80) and said second connector (82) is further defined as a female slot (82) for accepting said male projection (80) when said first (62) and second (64) portions are mounted onto said second end (20) of said pedal arm (14).

13. An assembly as set forth in claim 4 wherein said second end (20) of said pedal arm (14) includes a distal portion and wherein said bearing walls (66) of said first (62) and second (64) portions extend outwardly and substantially encompass said distal portion of said second end (20) of said pedal arm (14).

14. An assembly as set forth in claim 13 wherein said distal portion of said second end (20) is enclosed within said housing (12).

15. An assembly as set forth in claim 14 further including a partition (32) mounted within said housing (12) with one of said bearing walls (66) engaging said partition (32) and the other of said bearing walls (66) engaging said inner surface (28) of said housing (12) to provide said increased resistance.

16. An assembly as set forth in claim 1 wherein said resilient member (38) is further defined as a first resilient member (38) and further including a second resilient member (40) partially received within said housing (12).

17. An assembly as set forth in claim 16 wherein said second resilient member (40) includes a first distal end (46) and a second distal end (48) with said first distal end (46) seated against said housing (12) and said second distal end (48) of said second resilient member (40) engaging at least one of said first (62) and second (64) portions of said cap (60) to provide additional resistance during said movement of said pedal arm (14).

18. An assembly as set forth in claim 17 wherein said housing (12) includes a first curved recess (50) and said first resilient member (38) includes an outer surface, said first resilient member (38) being partially received within said first curved recess (50) such that said outer surface is forced into frictional contact with a portion of said first curved recess (50) during said movement of said pedal arm (14) between said rest and operative positions thereby reducing a biasing force of said first resilient member (38) on said pedal arm (14).

19. An assembly as set forth in claim 18 wherein said housing (12) includes a second curved recess (52) and said second resilient member (40) includes an outer surface, said second resilient member (40) being partially received within said second curved recess (52) such that said outer surface is forced into frictional contact with a portion of said second curved recess (52) during said movement of said pedal arm (14) between said rest and operative positions thereby reducing a biasing force of said second resilient member (40) on said pedal arm (14).

20. An assembly as set forth in claim 17 wherein said first portion (62) includes a first cam lobe (76) having a first integral groove with said second distal end (44) of said first resilient member (38) retained within said first integral groove of said first cam lobe (76).

21. An assembly as set forth in claim 20 wherein said first portion (62) includes a second cam lobe (78) having a second integral groove with said second distal end (48) of said second resilient member (40) retained within said second integral groove of said second cam lobe (78).

22. An assembly as set forth in claim 21 wherein said second cam lobe (78) is positioned in an upward stepped relation to said first cam lobe (76).

23. An assembly as set forth in claim 1 further including an electronic control sensor (54) supported by said housing (12) for generating an electric control signal that varies in magnitude in proportion to the extent of movement of said pedal arm (14) relative to said housing (12).

24. An assembly as set forth in claim 23 further including a shaft (22) mounted to said housing (12) with said pedal arm (14) mounted to said shaft (22) to define a pivot axis of said pedal arm (14).

25. An assembly as set forth in claim 24 wherein said pedal arm (14) is further defined as an accelerator pedal arm (14) with said accelerator pedal arm (14) and said control sensor (54) being pivotally mounted on said shaft (22) for concurrent movement about said pivot axis to generate an electronic control signal that varies in magnitude in proportion to the extent of movement of said accelerator pedal arm (14).

26. An assembly as set forth in claim 24 wherein said control sensor (54) includes a sensor arm (56) mounted to said shaft (22) for pivotal movement with said pedal arm (14) about said common pivot axis.

27. An assembly as set forth in claim 26 further including a sensing plate (58) mounted within said housing (12) for interacting with said sensor arm (56).

28. An assembly as set forth in claim 1 further including a pedal pad (18) mounted to said first end (16) of said pedal arm (14).

29. A pedal assembly (10) comprising:
   a housing (12) having at least one inner surface (28);
   a pedal arm (14) pivotally connected to said housing (12) for movement between a rest position and an operative position, said pedal arm (14) having a first end (16) and a second end (20);
   a cap (60), having a first portion (62) and a second portion (64), at least partially disposed over said second end (20) of said pedal arm (14) with said first (62) and second (64) portions moving relative to each other during said movement of said pedal arm (14) and each of said first (62) and second (64) portions including a bearing wall (66);
   a resilient member (38) partially received within said housing (12) and having a first distal end (42) seated against said housing (12) and a second distal end (44) engaging said first portion (62) of said cap (60) to provide resistance during said movement of said pedal arm (14); and
   a movement device disposed between said bearing walls (66) of said first (62) and second (64) portions for moving at least one of said bearing walls (66) into engagement with said inner surface (28) of said housing (12) in response to said pedal arm (14) moving between said rest and operative positions such that said engagement provides increased resistance during said movement of said pedal arm (14).

30. An assembly as set forth in claim 29 wherein said inner surface (28) of said housing (12) includes an integral channel (30) with said at least one of said bearing walls (66) sliding within said channel (30) during said movement of said pedal arm (14).

31. An assembly as set forth in claim 29 wherein said movement device is further defined as a ramped section (68) extending from each of said bearing walls (66) of said portions such that said second portion (64) can slide relative to said first portion (62) to move said bearing walls (66) inwardly and outwardly relative to each other.

32. An assembly as set forth in claim 29 wherein said movement device is further defined as a wedge (70) extending from each of said bearing walls (66) of said portions, said wedges (70) having interengaging ramped sections (68) such that said wedge (70) of said second portion (64) can slide relative to said wedge (70) of said first portion (62) to move said bearing walls (66) inwardly and outwardly relative to each other.

33. An assembly as set forth in claim 32 wherein said second end (20) of said pedal arm (14) includes a notch (72) and said wedge (70) of said second portion (64) seats within said notch (72) when said first (62) and second (64) portions are mounted to said pedal arm (14).

34. An assembly as set forth in claim 29 wherein said first portion (62) includes at least one cam lobe (76) having an integral groove with said second distal end (44) of said resilient member (38) being retained within said groove of said cam lobe (76).

35. An assembly as set forth in claim 29 wherein said first portion (62) includes a first connector (80) and said second portion (64) includes a second connector (82) engaging said first connector (80), said first (80) and second (82) connectors are slideably interconnected to secure said first portion (62) to said second portion (64).

36. An assembly as set forth in claim 29 further including a partition (32) mounted within said housing (12) with one of said bearing walls (66) engaging said partition (32) and the other of said bearing walls (66) engaging said inner surface (28) of said housing (12) to provide said increased resistance.

37. An assembly as set forth in claim 29 further including an electronic control sensor (54) supported by said housing (12) for generating an electric control signal that varies in magnitude in proportion to the extent of movement of said pedal arm (14) relative to said housing (12).

* * * * *